No. 800,486. PATENTED SEPT. 26, 1905.
F. W. RIBLET.
CARD INDEX.
APPLICATION FILED JULY 20, 1904.

3 SHEETS—SHEET 1.

Witnesses
Edward R. Monroe
Georgiana Chace

Inventor
Fred W. Riblet
By Luther V. Moulton
Attorney

No. 800,486. PATENTED SEPT. 26, 1905.
F. W. RIBLET.
CARD INDEX.
APPLICATION FILED JULY 20, 1904.
3 SHEETS—SHEET 2.
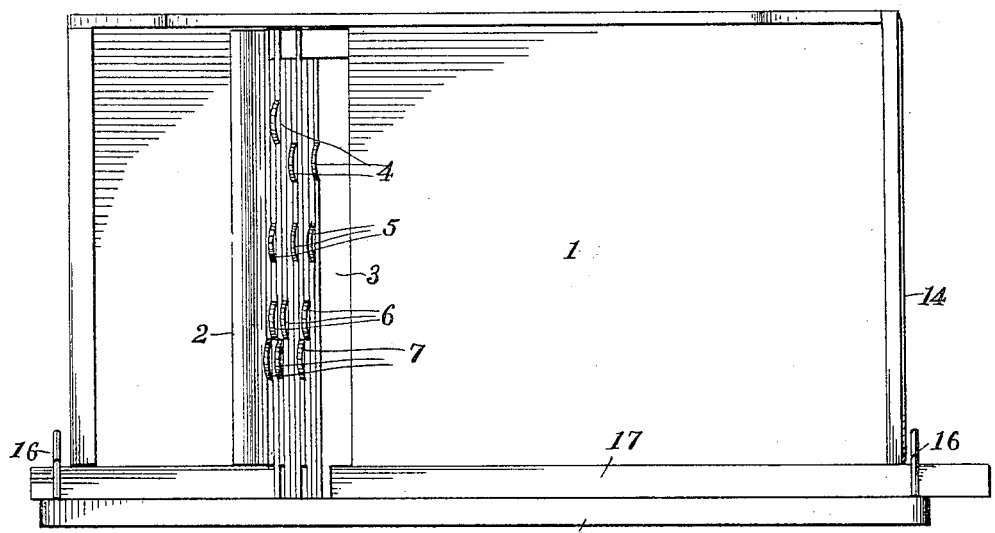
Fig. 3.
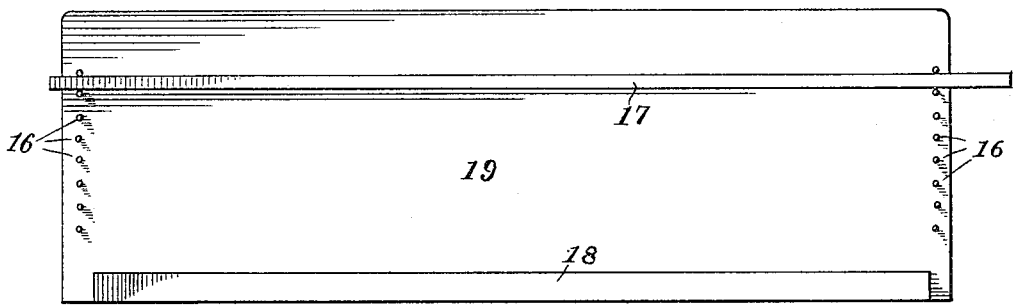
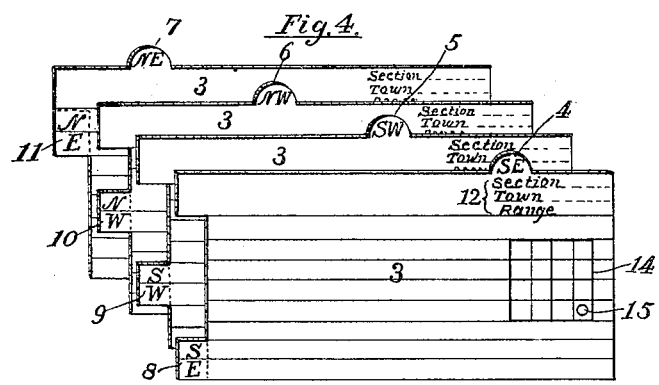
Fig. 5.
Witnesses
Edward R. Monroe
Georgiana Chace
Inventor
Fred W. Riblet
By Luther V. Moulton
Attorney No. 800,486. PATENTED SEPT. 26, 1905.
F. W. RIBLET.
CARD INDEX.
APPLICATION FILED JULY 20, 1904.

3 SHEETS—SHEET 3.

Witnesses
Edward R. Monroe
Georgiana Chace

Inventor
Fred W. Riblet
By Luther V. Moulton
Attorney

UNITED STATES PATENT OFFICE.

FRED W. RIBLET, OF NEWAYGO, MICHIGAN.

CARD-INDEX.

No. 800,486. Specification of Letters Patent. Patented Sept. 26, 1905.

Application filed July 20, 1904. Serial No. 217,580.

*To all whom it may concern:*

Be it known that I, FRED W. RIBLET, a citizen of the United States, residing at Newaygo, in the county of Newaygo and State of Michigan, have invented certain new and useful Improvements in Card-Indexes; and I do hereby declare the following to be a full, clear, and exact description of the invention, such as will enable others skilled in the art to which it appertains to make and use the same.

My invention relates to improvements in card-indexes, and more particularly to card-indexes designed for abstracting land-titles; and its object is to provide the same with means for readily selecting cards having thereon abstracts relating to any particular division or subdivision of land and to provide the device with various new and useful features hereinafter more fully described, and particularly pointed out in the claims.

My invention consists, essentially, of a series of cards having marginal portions and tabs corresponding to the various divisions and subdivisions of land or other subject-matter referred to on the cards, said portions and tabs being arranged so that all the portions or tabs, as the case may be, that represent a separate division or subdivision will be in a single line, means for engaging a bar with any one line of the marginal portions to move the cards having the same relative position to the remaining cards, and in the various novel features of combination and arrangement, as will more fully appear by reference to the accompanying drawings, in which—

Figure 1:
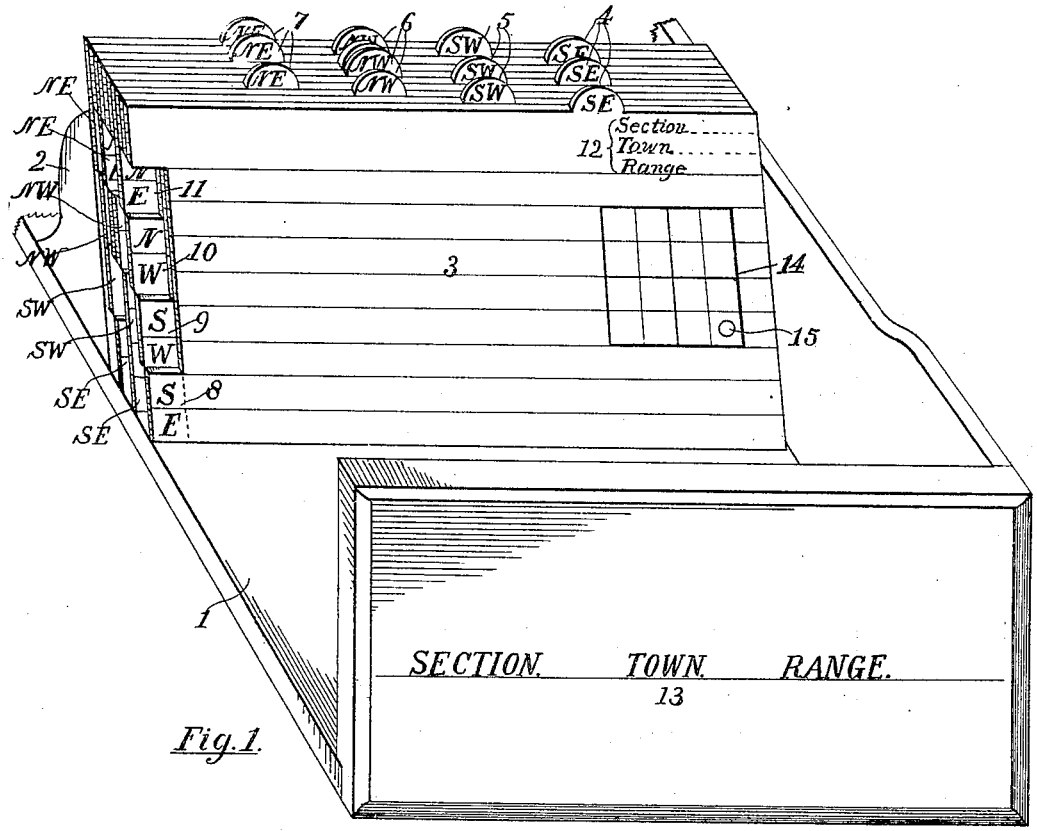
Figure 2:
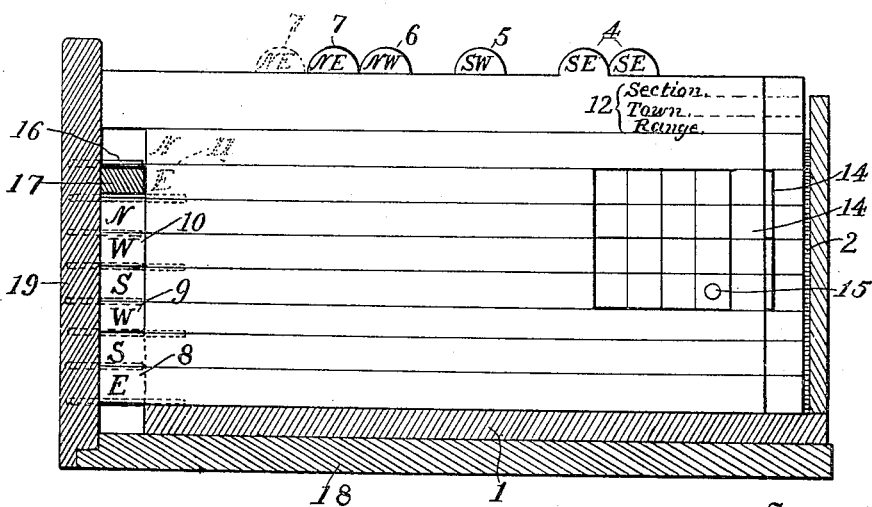

Figure 1 is a perspective of a tray with a series of cards; Fig. 2, a transverse vertical section of the tray and the selecting means, showing the cards in elevation; Fig. 3, a plan view of the same; Fig. 4, an elevation of the selecting means; Fig. 5, a detail of the first four cards of the series shown in Fig. 1; and Figs. 6 to 15, inclusive, plans of separate cards variously prepared to indicate various portions of land abstracted thereon.

Like numerals refer to like parts in all of the figures.

I have shown a device adapted for abstracting land-titles when such land is described by sections, quarter-sections, and quarters of quarters, or sixteenths, of sections in the usual way. It is obvious, however, that the device can be readily modified to conform to the titles of lands described otherwise—as, for instance, platted lands described by block and lot.

Figure 6:
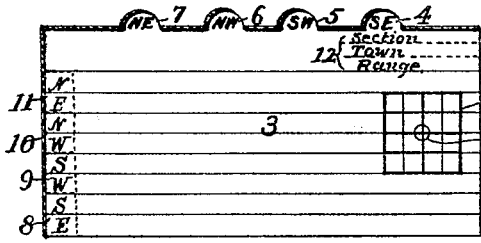
Figure 7:
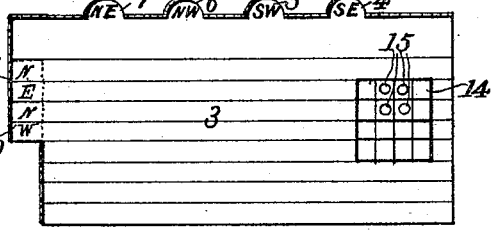
Figure 8:
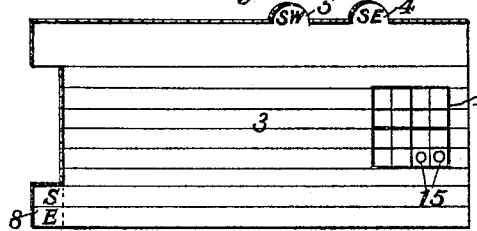
Figure 9:
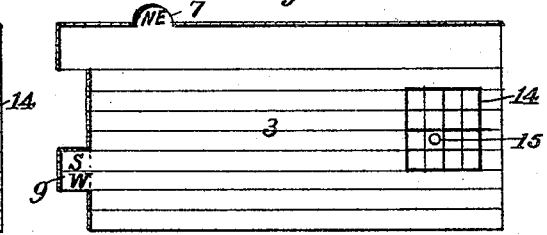
Figure 10:
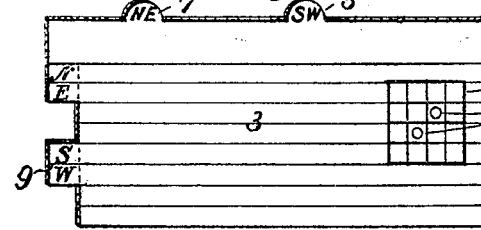
Figure 11:
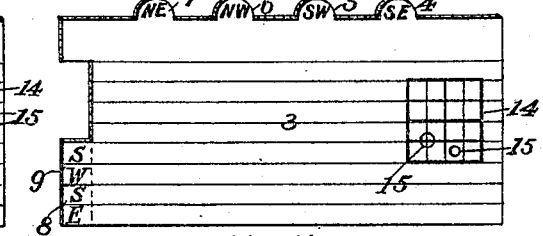
Figure 12:
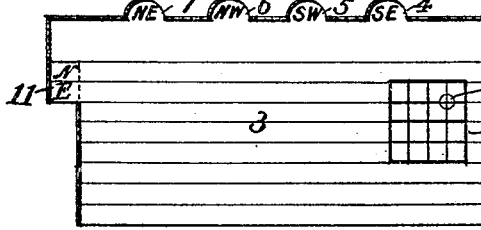
Figure 13:
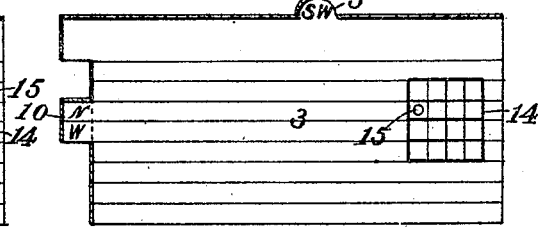
Figure 14:
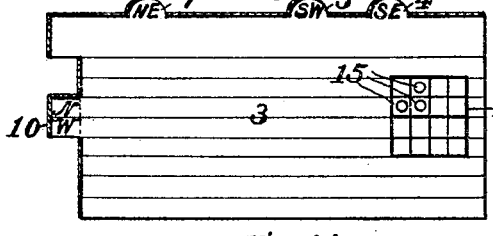
Figure 15:
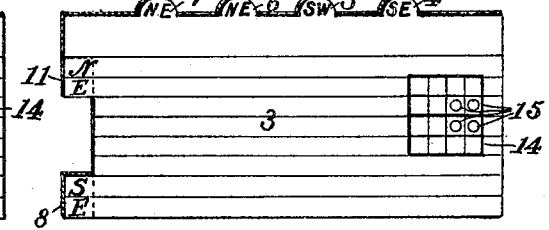

For the purpose of practically applying my invention I provide a suitable supply of cards, substantially as shown in Fig. 6, having a series of detachable portions 8, 9, 10, and 11, which in this instance represent the respective four quarters or main divisions of a section of land and are lettered accordingly, as shown. These portions are preferably at one end of the card, although obviously they may be at the bottom instead. Said cards are also provided with a series of tabs 4, 5, 6, and 7, which are also detachable and in this instance represent the respective four quarters of any quarter-section, (or sixteenths of a section,) the same being the minor subdivisions of any one main division and are lettered accordingly. All of the tabs representing a given sixteenth of a section are in the same relative position on the respective cards, so that when the cards are assembled one in front of another such tabs will be in alinement transversely of the cards. The portions 8, 9, 10, and 11 are arranged in like manner as to position on the cards and alinement when the cards are assembled. Said cards are also each provided with blanks 12, in which to enter the data indicating the particular section referred to and also with a plat 14 of a section of land showing the quarters and sixteenths of the same. To conveniently hold these cards, I provide a tray 1, having a follower 2, said tray being of a width substantially the same as the length of the cards, and in this instance having the side removed opposite the portions 8, 9, 10, and 11 of these cards to permit the cards to move endwise, as hereinafter explained.

For the purpose of sorting out all of the cards having abstracts thereon relating to any particular quarter-section I provide an assorting device comprising a bed-plate 18 to support the tray and a vertical wall 19, attached to the bed-plate and opposite the open side of the tray. In this wall are a series of supports consisting of pins 16, adapted to support a suitable bar 17 in various vertically-adjusted positions and opposite any one of the rows of portions 8, 9, 10, or 11 on the cards, whereby the bar will engage a single row of such portions and hold the cards having the same from moving longitudinally, as hereinafter described. In using this device I make an abstract of a given instrument (a deed or mortgage, for instance) on the face of a card, enter in the blank 12 the data indicating the section, also mark with any suitable symbol, as at 15, the particular sixteenth or other portion of the section referred to in the abstract. If it be one or more sixteenths, I place the symbol in the center of each sixteenth. If one or more quarters, I place it in the center of the quarter, where the lines cross, and in the center of the section, if the reference is to the entire section, as in Fig. 6. I then remove so many of the tabs as do not relate to the sixteenths of the section mentioned in the abstract and also remove all portions 8, 9, 10, and 11 that do not relate to the quarters of the section mentioned in the abstract. I then place the cards in a suitable tray provided for the particular section of land and having the data of the section thereon. Any quantity of these trays can obviously be stored in any suitable case. (Not shown.) When in the trays and in normal position, the cards will be arranged in series directly in front of each other, and the tabs will be in rows from front to rear and the rows spaced apart. If now a tray containing a quantity of such cards variously mutilated, as described, and illustrated in the drawings, be placed on the assorting means and the bar adjusted opposite the row 11, representing the northeast quarters, all of the cards having this portion will be held from moving by the bar, and all the other cards will move to the left by gravity when the device is tilted or rocked to the left, and thus all cards having abstracts thereon relating to the northeast quarter of the section will be separated out and project to the right of the other cards. The relative position of the tabs at the top will in like manner be changed, the tabs on the cards held by the bar remaining stationary, and all the others will be moved to the left the width of the bar 17. I am thus able to instantly assort out all cards having abstracts relating to any one quarter of the section and to also single out all tabs thereon indicating the particular sixteenths or quarters of such quarters. Of course if more than one quarter is mentioned in any abstract more than one of the portions 8, 9, 10, and 11 would remain on the card and if more than one sixteenth of a section then more than one tab would remain on the card, and if the entire section then all such portions and tabs would remain and the mark 15 be in the center of the diagram 14, as in Fig. 6.

My device is obviously adapted for other analogous uses—as, for instance, selecting from among cards having thereon data relating to various days of the year, all the cards relating to any one certain day, in which case twelve main divisional portions would be provided to represent the months or main divisions, thirty-one alined tabs provided for the days, and twelve adjustments provided for the bar.

Having thus fully described my invention, what I claim, and desire to secure by Letters Patent, is—

1. The combination of a series of cards having tabs to indicate minor subdivisions, and marginal portions to indicate major subdivisions, said tabs and portions being arranged in alinement when the cards are arranged one in front of another, a bar to engage any one line of said marginal portions, means for supporting the cards, and means for adjusting and supporting the bar.

2. The combination of a series of cards having projecting end portions arranged in various lines, a tray in which the cards are longitudinally and separately movable, a bar to engage a line of said projections and hold the cards having the same from moving, and means for adjusting the bar.

3. In a card-index the combination of a series of cards having projecting end portions arranged in several lines to correspond to the several main divisions of the subject-matter entered on the cards, and also having tabs normally arranged in several lines corresponding to the minor divisions of any one main division of the said subject-matter, a tray in which the cards are separately movable transversely of the tray, a bar to engage any one line of the end portions and hold the cards having the same from moving.

4. The combination of a tray having one side removed, a series of cards having projecting end portions arranged in various lines, a bed-plate to support the tray, a vertical wall attached to the bed-plate, supports on the wall to vertically adjust and support the bar, and a bar to engage any one of the lines of end portions on the cards.

5. The combination of a tray having one side removed, a series of cards having end portions adapted to represent the quarters of a section of land, and tabs to represent the sixteenths of said section, the projections for each quarter and the tabs for each sixteenth being respectively in a line, a vertical wall opposite the open side of the tray, a bar to engage any one line of projections and supports on the wall to adjust and support the bar.

6. The combination of a tray, a series of cards movable transversely of the tray, said cards having detachable portions representing the quarters of a section of land and arranged in four lines, a bar adjustable opposite any one line of said portions, means for supporting said bar, and detachable tabs on said cards arranged in four lines, severally representing the four sixteenths of a section in any one quarter of the same.

7. The combination of a tray having one side removed, a series of cards having detachable end portions arranged in four lines severally representing the four quarters of a section of land, and also having detachable tabs representing the four sixteenths of a section in each quarter of a section of land, a diagram of a section of land on each card, a vertical wall, supports on the wall for adjustably supporting a bar, means for supporting the wall opposite the open side of the tray, and a bar adapted to engage any one line of said portions on the cards.

8. As an article of manufacture, cards having end portions severally representing the major divisions of the subject-matter to which the cards relate, and also having side portions severally representing the subdivisions of any one of the said major divisions, each of said portions also being detachable from the card.

9. As an article of manufacture, cards each having end portions marked to indicate the respective major divisions of a quantity of land, and side portions marked to indicate the respective subdivisions of any one of the respective major divisions of the land, each of said portions also being detachable from the card.

10. As an article of manufacture, cards each having marginal portions at one end marked to indicate the respective quarters of a section of land, and tabs on one side marked to indicate the respective quarters of any one quarter-section of land, each of said end portions and tabs also being detachable from the card.

In testimony whereof I affix my signature in presence of two witnesses.

FRED W. RIBLET.

Witnesses:
MAUD SAILORS,
ELIZABETH Y. TRUMAN.